US010647537B2

(12) United States Patent
Hirata et al.

(10) Patent No.: US 10,647,537 B2
(45) Date of Patent: *May 12, 2020

(54) CONVEYING APPARATUS (71) Applicant: BROTHER KOGYO KABUSHIKI KAISHA, Nagoya-shi, Aichi-ken (JP)

(72) Inventors: Kenichi Hirata, Nagoya (JP); Shougo Sato, Seto (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,545

(22) Filed: Oct. 5, 2018

(65) Prior Publication Data
US 2019/0127172 A1 May 2, 2019

Related U.S. Application Data (63) Continuation of application No. 15/710,066, filed on Sep. 20, 2017, now Pat. No. 10,099,884.

(30) Foreign Application Priority Data

Sep. 30, 2016 (JP) ................................ 2016-194007

(51) Int. Cl.
B65H 29/60 (2006.01)
B41J 13/00 (2006.01)
(Continued)

(52) U.S. Cl.
CPC ............ *B65H 29/60* (2013.01); *B41J 13/009* (2013.01); *B41J 13/106* (2013.01); *B65H 29/52* (2013.01);
(Continued)

(58) Field of Classification Search
CPC .... B65H 29/58; B65H 29/60; B65H 2402/10; B65H 2402/40; B65H 2408/111; B65H 2408/1164
(Continued)

(56) References Cited

U.S. PATENT DOCUMENTS 6,308,952 B1 10/2001 Takagi
6,331,003 B1 12/2001 Yokota
(Continued)

FOREIGN PATENT DOCUMENTS

JP 9-304990 A 11/1997
JP 2771982 B2 7/1998
(Continued)

OTHER PUBLICATIONS

Computer translation of Japanese Patent Application No. 1220677, which corresponds to JP 2771982.

*Primary Examiner* — David H Bollinger
(74) *Attorney, Agent, or Firm* — Merchant & Gould P.C.

(57) ABSTRACT

A conveying apparatus, including: a conveyor mechanism; a housing; a first tray configured to receive a medium conveyed by the conveyor mechanism; an image reader disposed above the first tray, wherein a first discharge opening for discharging the medium outside the housing is formed in an upper surface of the housing so as not to overlap the image reader when viewed from above, and wherein the conveying apparatus further includes: a switcher for switching a destination of the medium selectively between the first tray and the first discharge opening; and a tray unit removably mountable on the upper surface of the housing and including a first introduction opening opposed to the first discharge opening, a second conveyance path for conveying the medium passed the first discharge opening and the first introduction opening, and at least one second tray for receiving the medium conveyed through the second conveyance path.

11 Claims, 9 Drawing Sheets (51) Int. Cl.
*B41J 13/10* (2006.01)
*G03G 15/00* (2006.01)
*H04N 1/00* (2006.01)
*B65H 29/52* (2006.01)
*B65H 31/24* (2006.01)
*B65H 85/00* (2006.01)
*B65H 29/58* (2006.01)

(52) U.S. Cl.
CPC ............ *B65H 29/58* (2013.01); *B65H 31/24* (2013.01); *B65H 85/00* (2013.01); *G03G 15/6538* (2013.01); *G03G 15/6552* (2013.01); *H04N 1/00* (2013.01); *H04N 1/00612* (2013.01); *H04N 1/00633* (2013.01); *B65H 2301/33312* (2013.01); *B65H 2402/10* (2013.01); *B65H 2402/63* (2013.01); *B65H 2404/632* (2013.01); *B65H 2405/332* (2013.01); *B65H 2408/111* (2013.01); *B65H 2408/1164* (2013.01); *B65H 2601/325* (2013.01); *B65H 2801/06* (2013.01); *B65H 2801/39* (2013.01); *G03G 2221/1696* (2013.01)

(58) Field of Classification Search
USPC .......................................................... 271/303
See application file for complete search history.

(56) References Cited

U.S. PATENT DOCUMENTS

| | | | |
|---|---|---|---|
| 6,381,442 | B1 | 4/2002 | Okitsu |
| 6,443,449 | B1 | 9/2002 | Takagi |
| 6,634,640 | B1 | 10/2003 | Yoshizawa |
| 10,099,884 | B2 * | 10/2018 | Hirata .................... B41J 13/009 |
| 2015/0274469 | A1 | 10/2015 | Mori |
| 2015/0353314 | A1 | 12/2015 | Wada |
| 2016/0280496 | A1 | 9/2016 | Masuda |

FOREIGN PATENT DOCUMENTS

| | | |
|---|---|---|
| JP | 11-65198 A | 3/1999 |
| JP | 11-157731 A | 6/1999 |

\* cited by examiner

FIG.9B

CONVEYING APPARATUS

CROSS REFERENCE TO RELATED APPLICATION

The present application is a continuation of U.S. patent application Ser. No. 15/710,066, filed Sep. 20, 2017, now U.S. Pat. No. 10,099,884, which further claims priority from Japanese Patent Application No. 2016-194007, filed on Sep. 30, 2016, the disclosures of both of which are herein incorporated by reference in their entirety.

BACKGROUND

Technical Field

The following disclosure relates to a conveying apparatus including: a main body having a receiving tray; an image reader; and an optional unit having at least one optional receiving tray and configured to be mountable on and removable from the apparatus.

Description of Related Art

There has been known a technique of removably mounting, on a conveying apparatus, an optional unit having at least one receiving tray. In a known copying machine (conveying apparatus), for instance, an upright portion including a conveyance path is mounted on one side of the copying machine, and a sorter (optional unit) is removably mounted on an upper end portion of the upright portion.

SUMMARY

The known conveying apparatus in which the upright portion is mounted on one side of the apparatus and the optional unit is mounted on the upper end portion of the upright portion inevitably has a large footprint occupied on the horizontal plane. In the known conveying apparatus, the upright portion is mounted on one side thereof such that the upright portion is located at a height level higher than a lower surface of the conveying apparatus, and the optional unit is mounted on the upper end portion of the thus mounted upright portion. According to this configuration, the center of gravity of the apparatus as a whole is located outside a region occupied or taken up by the apparatus on the horizontal plane, causing instability in posture of the apparatus as a whole and resulting in a risk that the apparatus falls over or topples over.

Accordingly, an aspect of the disclosure relates to a conveying apparatus having a construction in which an optional unit is removably mountable on the apparatus, the conveying apparatus obviating an increase in a footprint of the apparatus as a whole on a horizontal plane and having a reduced risk of falling over or toppling over.

One aspect of the disclosure relates to a conveying apparatus including: a conveyor mechanism configured to convey a medium through a first conveyance path; a housing that houses the conveyor mechanism; a first tray configured to receive the medium conveyed by the conveyor mechanism; an image reader disposed above the first tray, wherein a first discharge opening is formed in an upper surface of the housing so as not to overlap the image reader when viewed from above, the medium conveyed by the conveyor mechanism being discharged outside the housing from the first discharge opening, wherein the conveying apparatus further comprises: a switcher configured to switch a destination of the medium selectively between the first tray and the first discharge opening; and a tray unit mountable on and removable from the upper surface of the housing, the tray unit including a first introduction opening opposed to the first discharge opening, a second conveyance path through which the medium that has passed through the first discharge opening and the first introduction opening is conveyed, and at least one second tray configured to receive the medium that has been conveyed through the second conveyance path.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

First Embodiment

Figure 1:
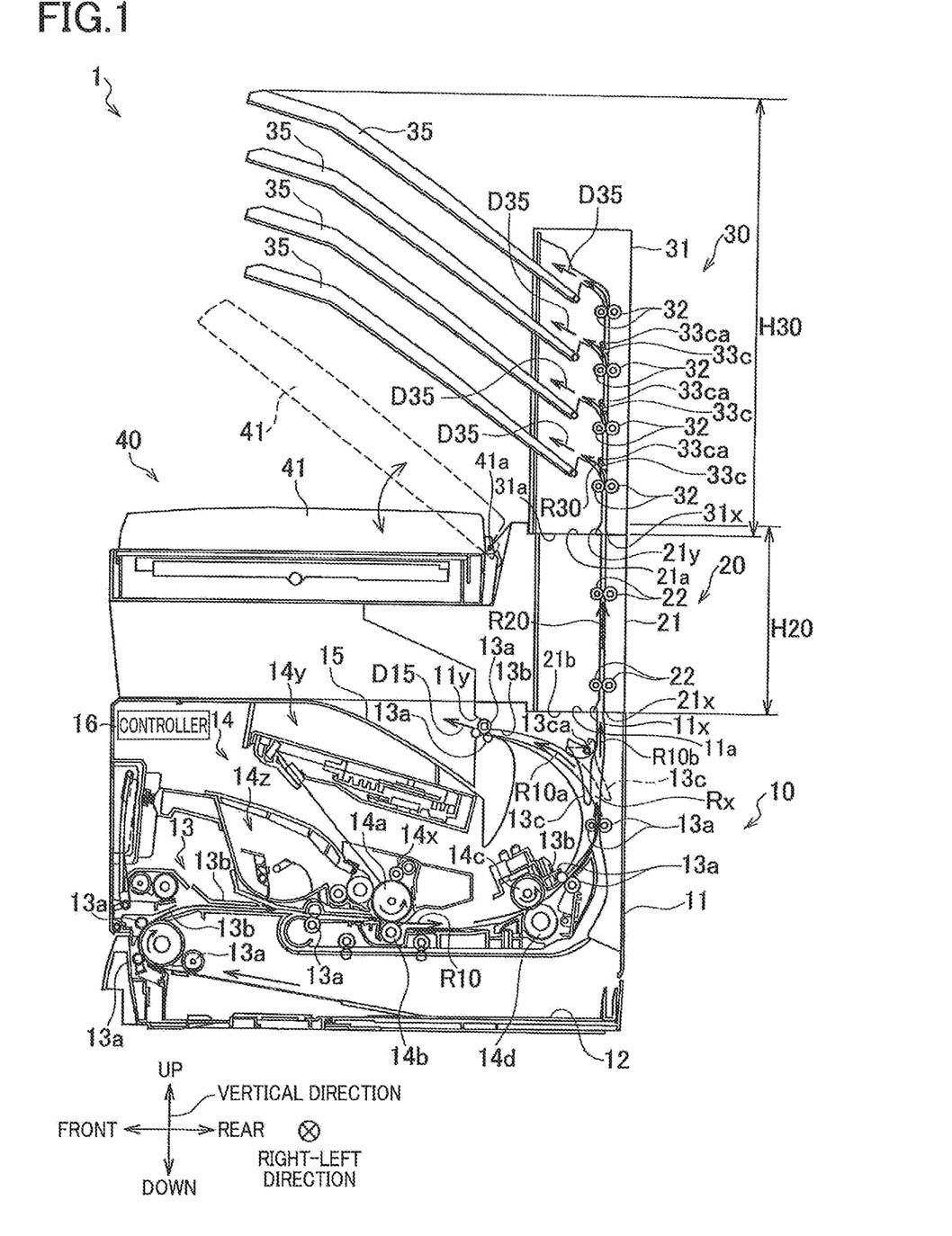
FIG. 1 is a schematic view of a printer according to a first embodiment.

Referring first to FIG. 1, there will be explained an overall structure of a printer 1 according to a first embodiment of the present disclosure.

In the following explanation, a left side and a right side in FIG. 1 are respectively defined as a front side and a rear side of the printer 1. A side corresponding to a front surface of the drawing sheet of FIG. 1 and a side corresponding to a back surface of the drawing sheet of FIG. 1 are respectively defined as a right side and a left side of the printer 1. Further, an upper side and a lower side in FIG. 1 are respectively defined as an upper side and a lower side of the printer 1.

The printer 1 includes a main body 10, an intermediate unit 20, an optional unit 30 (as one example of "tray unit"), and a scanner unit 40 (as one example of "image reader").

The main body 10 includes a housing 11, a storage tray 12, a conveyor mechanism 13, an image former 14, a receiving tray 15 (as one example of "first tray"), and a controller 16. The storage tray 12 is provided at a lower portion of the housing 11 and is capable of storing a plurality of sheets (each as one example of "medium") to be conveyed by the conveyor mechanism 13. The receiving tray 15 is provided at an upper portion of the housing 11 and is capable of receiving the sheets that have been conveyed by the conveyor mechanism 13. The controller 16 includes a central processing unit (CPU), a read only memory (ROM), and a random access memory (RAM) and controls devices of the printer 1 based on a command sent from an external apparatus such as a personal computer (PC) connected to the printer 1.

The housing 11 has a generally rectangular parallelepiped shape and houses the storage tray 12, the conveyor mechanism 13, the image former 14, and the controller 16. The receiving tray 15 is constituted by an upper surface 11a of the housing 11. A discharge opening 11x, through which the sheet conveyed by the conveyor mechanism 13 is discharged outside the housing 11, is formed in a region of the upper surface 11a of the housing 11 in which the receiving tray 15 is not provided, namely, the discharge opening 11x is located rearward of the receiving tray 15. A discharge opening 11y, through which the sheet conveyed by the conveyor mechanism 13 is discharged to the receiving tray 15, is formed at an upper portion of the housing 11 between the receiving tray 15 and the discharge opening 11x. The receiving tray 15 is disposed downstream of the discharge opening 11x in a movement direction D15 in which the sheet moves when received by the receiving tray 15. The movement direction D15 is one example of "first direction".

The conveyor mechanism 13 is configured to convey the sheet along a path R10 formed in the housing 11 and includes conveyance rollers 13a, guides 13b, and a switcher 13c. The path R10 includes a path R10a extending from the storage tray 12 to the receiving tray 15 and a path R10b extending from the storage tray 12 to the discharge opening 11x. The path R10b is common, at its portion extending from the storage tray 12 to a branch position Rx, to the path R10a and branches off from the path R10a at the branch position Rx. The switcher 13c is disposed at the branch position Rx. The switcher 13c is pivotable about a shaft 13ca extending in a right-left direction, so as to be movable between: a position (indicated by the dashed line in FIG. 1) at which the switcher permits the sheet to be conveyed to the receiving tray 15; and a position (indicated by the solid line in FIG. 1) at which the switcher 13c permits the sheet to be conveyed to the discharge opening 11x. That is, the conveyor mechanism 13 is configured to convey the sheet selectively to one of the receiving tray 15 and the discharge opening 11x.

The image former 14 includes a photoconductive drum 14a, a transfer roller 14b, a charging unit 14x, a laser unit 14y, a toner unit 14z, a fixing roller 14c, and a pressure roller 14d. The photoconductive drum 14a and the transfer roller 14b are disposed upstream of the branch position Rx in the path R10, so as to be in contact with each other with the path R10 interposed therebetween. The fixing roller 14c and the pressure roller 14d are disposed upstream of the branch position Rx in the path R10 and downstream of the photoconductive drum 14a and the transfer roller 14b, so as to be in contact with each other with the path R10 interposed therebetween.

The surface of the photoconductive drum 14a is charged by the charging unit 14x and is irradiated with a laser light emitted from the laser unit 14y, so as to form an electrostatic latent image on the surface. Further, toner is applied to the surface from the toner unit 14z, so as to form a toner image. The transfer roller 14b, to which is applied a voltage opposite to a voltage applied to the photoconductive drum 14a, transfers the toner image to the sheet nipped by the photoconductive drum 14a and the transfer roller 14b. Subsequently, toner is fixed on the sheet by the heat of the fixing roller 14c and the pressure of the fixing roller 14c and the pressure roller 14d. Thus, an image is formed on the sheet by the image former 14.

The intermediate unit 20 includes a housing 21 and conveyance rollers 22.

The housing 21 is mountable on and removable from the upper surface 11a of the housing 11 and houses the conveyance rollers 22. An introduction opening 21x corresponding to the discharge opening 11x is formed in a lower surface 21b of the housing 21. A discharge opening 21y that communicates with the introduction opening 21x is formed in an upper surface 21a of the housing 21. There is formed, in the housing 21, a path R20 through which the sheet is conveyed from the introduction opening 21x to the discharge opening 21y. In the present embodiment, the path R20 linearly extends in the vertical direction. The introduction opening 21x and the discharge opening 21y are arranged in the vertical direction so as to align with each other as seen in the vertical direction.

The conveyance rollers 22 convey the sheet along the path R20. Two pairs of the conveyance rollers 22 are disposed along the path R20 so as to be spaced apart from each other. The conveyance rollers 22 of each pair are in contact with each other with the path R20 interposed therebetween.

The optional unit 30 includes a housing 31, conveyance rollers 32, and four receiving trays 35.

The housing 31 is mountable on and removable from the upper surface 21a of the housing 21 and houses the conveyance rollers 32. (The housing 31 is mountable on and removable from the upper surface 11a of the housing 11 in an instance where the intermediate unit 20 is not provided.) An introduction opening 31x (as one example of "first introduction opening") corresponding to the discharge opening 21y is formed in a lower surface 31a of the housing 31. (The introduction opening 31x corresponds to the discharge opening 11x in an instance where the housing 31 is mounted on the upper surface 11a of the housing 11.) There is formed, in the housing 31, a path R30 (as one example of "second conveyance path") through which the sheet is conveyed from the introduction opening 31x to each receiving tray 35 (as one example of "second tray"). The path R30 includes: a path extending to an uppermost one of the four receiving trays 35; and three paths that branch off from the path at respective three branch positions, so as to respectively extend to the three receiving trays 35 disposed below the uppermost receiving tray 35. Switchers 33c similar to the switcher 13c are provided at the respective three branch positions. Each switcher 33c is pivotable about a corresponding shaft 33ca that extends in the right-left direction, so as to be movable between: a position (indicated by the dashed line in FIG. 1) at which the switcher 33c permits the sheet to be conveyed to the corresponding receiving tray 35; and a position (indicated by the solid line in FIG. 1) at which the switcher 33c permits the sheet to be conveyed upward.

In an instance where the intermediate unit 20 is provided in the printer 1 as shown in FIG. 1, the housing 11 and the housing 21 are one example of "housing", the paths R10 and R20 are one example of "first conveyance path", the discharge opening 21y is one example of "first discharge opening", the discharge opening 11x is one example of "second discharge opening", the path R10 is one example of "third conveyance path", the path R20 is one example of "fourth conveyance path", and the introduction opening 21x is one example of "second introduction opening". On the other hand, in an instance where the intermediate unit 20 is not provided in the printer 1, the housing 11 is one example of "housing", the path R10 is one example of "first conveyance path", and the discharge opening 11x is one example of "first discharge opening".

The four receiving trays 35 are arranged in the vertical direction. The four receiving trays 35 are supported at respective proximal portions by the housing 31 and protrude from the housing 31 forward and obliquely upward. A movement direction D35 in which the sheet moves when received by each receiving tray 35 is the same as the movement direction D15. That is, the movement direction D35 is a direction from the rear side toward the front side.

The scanner unit 40 is configured to read an image on the sheet. The scanner unit 40 is supported by the intermediate unit 20 and is disposed at a front portion of the upper surface 21a of the housing 21. The scanner unit 40 is disposed at the front portion of the upper surface 21a of the housing 21, and the discharge opening 21y is formed at a rear portion of the upper surface 21a of the housing 21 which is outside a region of the upper surface 21a in which the scanner unit 40 is disposed. That is, the scanner unit 40 is disposed downstream of the discharge opening 21y in the movement direction D15, D35. In other words, the discharge opening 21y is formed in the upper surface 21a of the housing 21 so as not to overlap the scanner unit 40 when viewed from above. The scanner unit 40 includes a cover 41 (as one example of "opening and closing member") configured to be openable about a shaft 41a located on the upstream side in the movement direction D15, D35 so as to extend in the right-left direction. The cover 41 is disposed below the receiving trays 35.

The scanner unit 40 is disposed below the receiving trays 35 and above the receiving tray 15. That is, the receiving tray 15, the scanner unit 40, and the receiving trays 35 are disposed in this order from the bottom. Respective projective regions obtained by projecting, in the vertical direction, the receiving tray 15, the scanner unit 40, and the receiving trays 35 onto an imaginary plane orthogonal to the vertical direction at least partially overlap one another. In other words, the four receiving trays 35 are disposed so as to overlap the scanner unit 40 when viewed from above, as shown in FIG. 1. The intermediate unit 20 has a length H20 in a height direction smaller than a length H30 of the optional unit 30 in the height direction.

Figure 2:
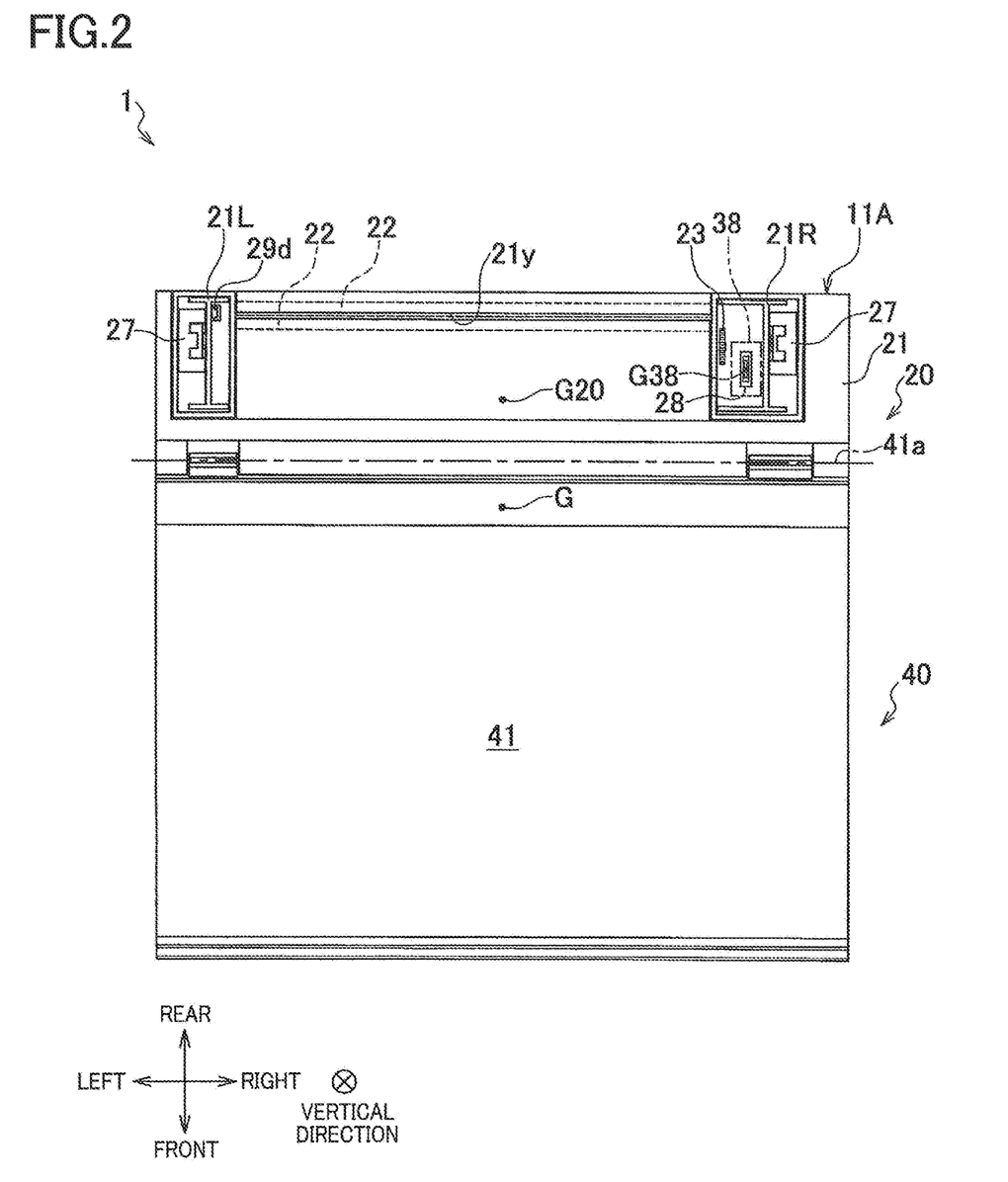
FIG. 2 is a plan view of the printer of the first embodiment from which an optional unit is removed.
Figure 3A:
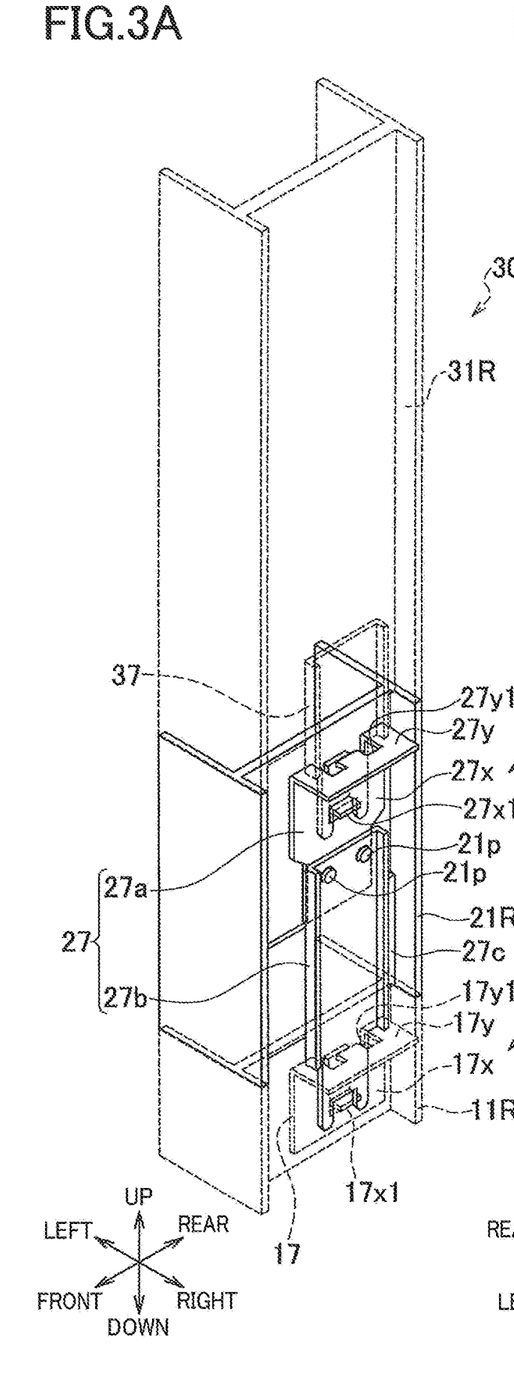
FIG. 3A is a perspective view showing an outer side of respective right-side columns of a main body of the printer, an intermediate unit, and the optional unit in the printer of the first embodiment
Figure 3B:
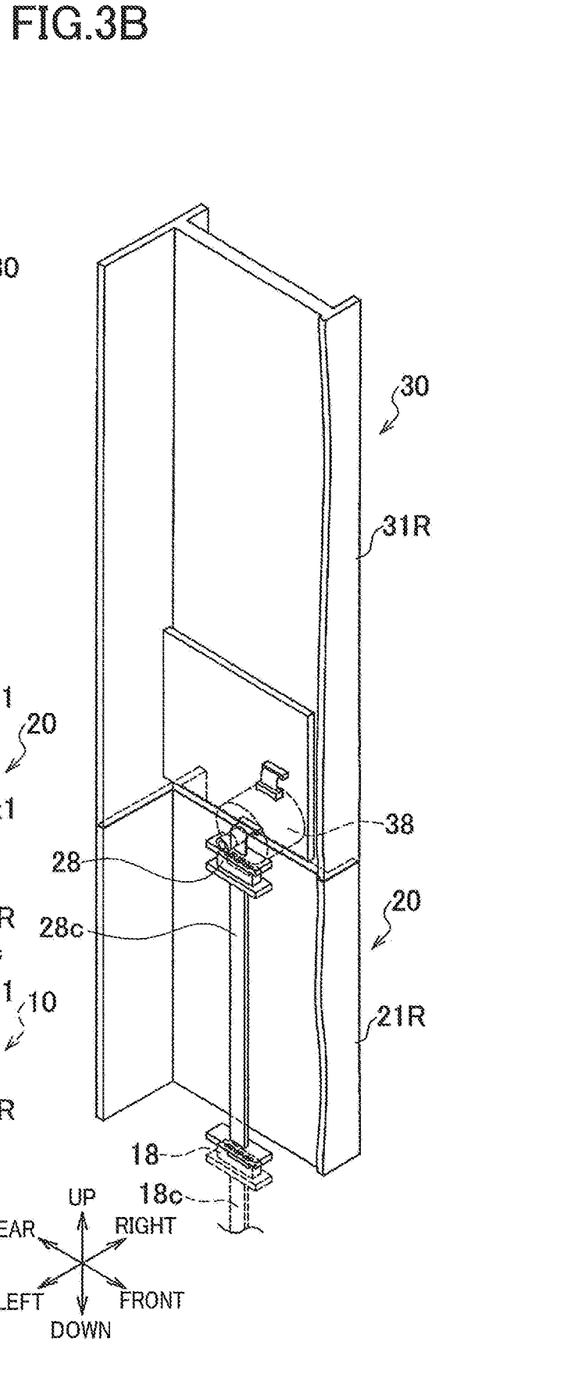
FIG. 3B is a perspective view showing an inner side of the right-side columns of the intermediate unit and the optional unit in the printer of the first embodiment.
Figure 4A:
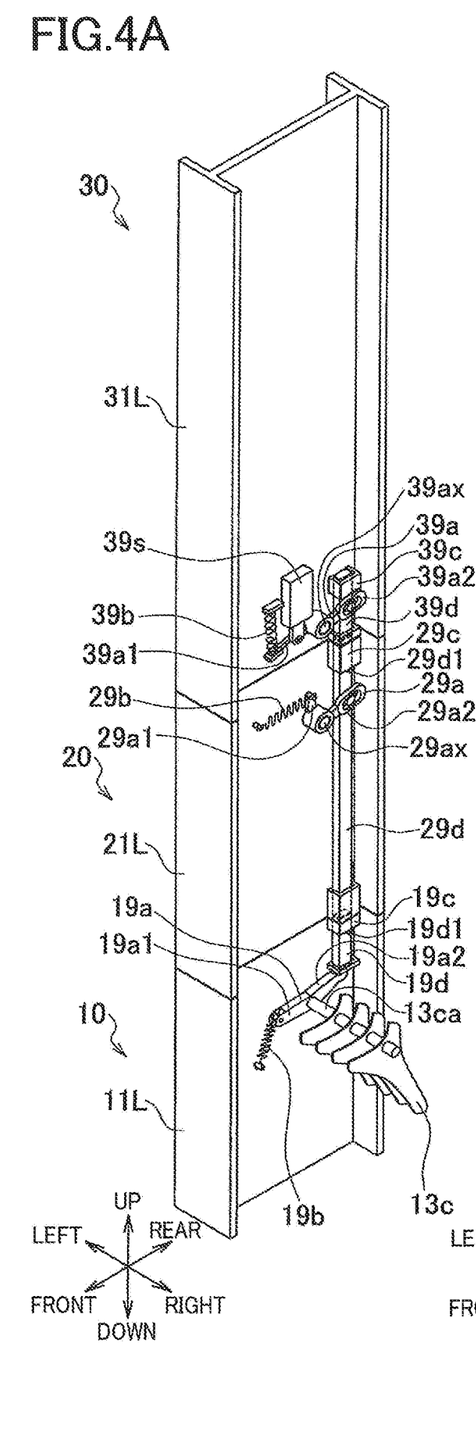
FIGS. 4A and 4B are perspective views showing an inner side of respective left-side columns of the main body, the intermediate unit, and the optional unit in the printer of the first embodiment, FIG. 4A showing a state in which a switcher is located at a position at which the switcher permits a sheet to be conveyed to a receiving tray of the main body, FIG. 4B showing a state in which the switcher is located at a position at which the switcher permits the sheet to be conveyed to a discharge opening of the main body.
Figure 4B:
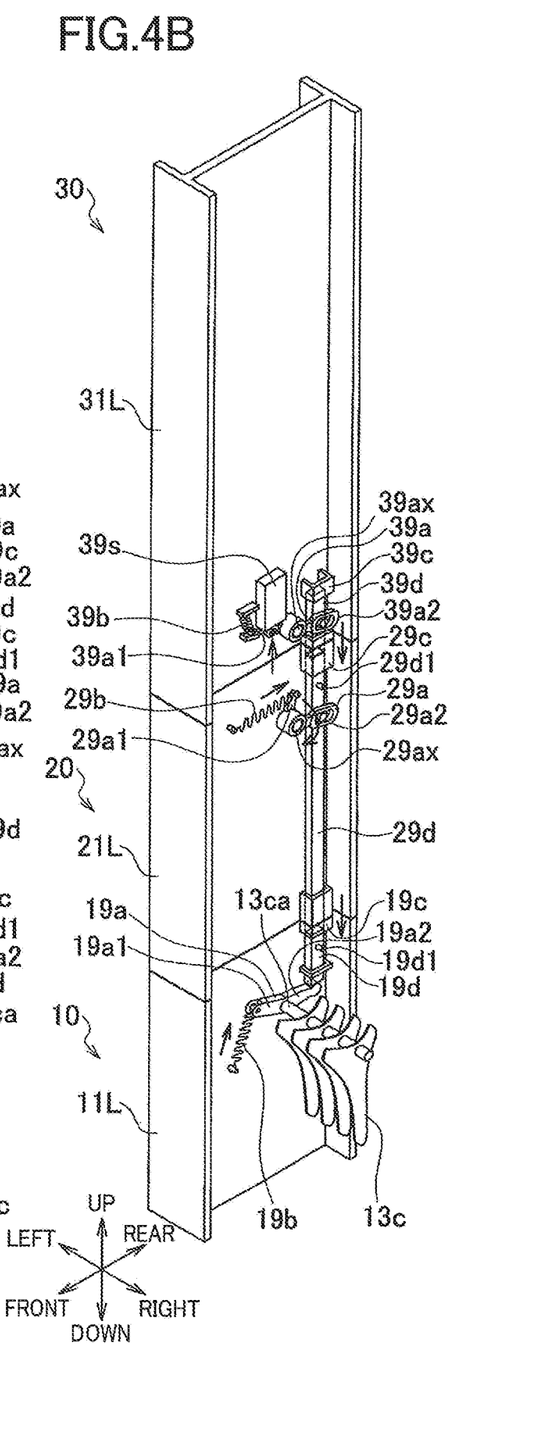

Referring next to FIGS. 2-4, the main body 10, the intermediate unit 20, and the optional unit 30 will be explained in detail.

The intermediate unit 20 includes a pair of columns 21L, 21R which extend in the vertical direction and which are opposed to and spaced apart from each other in the right-left direction. The optional unit 30 includes a pair of columns 31L, 31R which extend in the vertical direction and which are opposed to and spaced apart from each other in the right-left direction. The main body 10 includes a pair of columns 11L, 11R which extend in the vertical direction and which are opposed to and spaced apart from each other in the right-left direction. The columns 11L, 11R, the columns 21L, 21R, and the columns 31L, 31R are arranged in the vertical direction in this order from the bottom. The columns 11L, 11R are fixed to the housing 11, the columns 21L, 21R are fixed to the housing 21, and the columns 31L, 31R are fixed to the housing 31. Each of the columns 11L, 11R, 21L, 21R, 31L, 31R has an H-shaped cross section taken along a plane orthogonal to the vertical direction.

Metal members 17, 27, 37 are respectively attached to outer surfaces of the columns 11L, 11R, outer surfaces of the columns 21L, 21R, and outer surfaces of the columns 31L, 31R. Specifically, the metal member 17 is attached to the outer surface of each column 11L, 11R. While only the metal member 17 attached to the outer surface of the right-side column 11R is illustrated in FIG. 3A, the metal member 17 is similarly attached to the outer surface of the left-side column 11L. The metal member 27 is attached to the outer surface of each column 21L, 21R. While only the metal member 27 attached to the outer surface of the right-side column 21R is illustrated in FIG. 3A, the metal member 27 is similarly attached to the left-side column 21L. The metal member 37 is attached to the outer surface of each column 31L, 31R. While only the metal member 37 attached to the outer surface of the right-side column 31R is illustrated in FIG. 3A, the metal member 37 is similarly attached to the outer surface of the left-side column 31L. The metal member 17, 27, 37 of one unit functions as a connector by which the one unit is connected to another unit.

The metal member 17 functions as a connector of the main body 10 by which the main body 10 is connected to the intermediate unit 20 or the optional unit 30. The metal member 17 includes: a base portion 17x shaped like a plate and extending in the vertical direction; and a protruding portion 17y protruding from the base portion 17x outward of the column 11L, 11R in the right-left direction. The base portion 17x is provided with a protrusion 17x1 for positioning the intermediate unit 20 or the optional unit 30 with respect to the main body 10 in the vertical direction. The protruding portion 17y has a through-hole 17y1 into which an insertion portion 27b of the metal member 27 or the metal member 37 is insertable. The through-hole 17y1 is formed through the protruding portion 17y in the vertical direction.

The metal member 37 shaped like a plate and extending in the vertical direction functions as a connector of the optional unit 30 by which the optional unit 30 is connected to the intermediate unit 20 or the main body 10.

The metal member 27 includes: a receiver portion 27a functioning as a connector of the intermediate unit 20 by which the intermediate unit 20 is connected to the optional unit 30; and the insertion portion 27b functioning as a connector of the intermediate unit 20 by which the intermediate unit 20 is connected to the main body 10.

The receiver portion 27a is similar to the metal member 17 in construction. That is, the receiver portion 27a includes: a base portion 27x shaped like a plate and extending in the vertical direction; and a protruding portion 27y protruding from the base portion 27x outward of the column 21L, 21R in the right-left direction. The base portion 27x is provided with a protrusion 27x1 for positioning the optional unit 30 with respect to the intermediate unit 20 in the vertical direction. The protruding portion 27y has a through-hole 27y1 into which the metal member 37 is insertable. The through-hole 27y1 is formed through the protruding portion 27y in the vertical direction.

The insertion portion 27b is similar to the metal member 37 in construction. That is, the insertion portion 27b is shaped like a plate and extends in the vertical direction.

The receiver portion 27a is fixed to the column 21L, 21R such that a lower end of the base portion 27x is inserted onto a pair of protrusions 21p provided on the outer surface of the column 21L, 21R. The insertion portion 27b is fixed to the column 21L, 21R such that an upper end of the insertion portion 27b is inserted onto the pair of protrusions 21p. The receiver portion 27a and the insertion portion 27b are fixed relative to each other through the pair of protrusions 21p.

The base portion 27x of the receiver portion 27a is in contact with the outer surface of the column 21L, 21R. The insertion portion 27b is in contact with an outer surface of the lower end of the base portion 27x and an outer surface of a plate 27c which is fixed to the outer surface of the column 21L, 21R below the base portion 27x. Thus, a clearance is defined between the insertion portion 27b and the outer surface of the column 21L, 21R. The plate 27c has the same thickness as the base portion 27x. In other words, a projective region obtained by projecting the insertion portion 27b in the vertical direction onto the imaginary plane orthogonal to the vertical direction and a projective region obtained by projecting the base portion 27x of the receiver portion 27a in the vertical direction onto the imaginary plane do not coincide with each other but are adjacent to each other.

Like the insertion portion 27b, the metal member 37 is fixed to the outer surface of the column 31L, 31R via a plate (not shown) having the same thickness as the base portion 27x. Thus, a clearance is defined between the metal member 37 and the outer surface of the column 31L, 31R.

The base portion 17x and the protruding portion 17y of the metal member 17 are disposed so as to respectively align with the base portion 27x and the protruding portion 27y of the receiver portion 27a as seen in the vertical direction. The metal member 37 is disposed so as to align with the insertion portion 27b as seen in the vertical direction. In other words, a projective region obtained by projecting, in the vertical direction, the insertion portion 27b functioning as the connector of the intermediate unit 20 connecting the intermediate unit 20 to the main body 10 onto the imaginary plane orthogonal to the vertical direction coincides with a projective region obtained by projecting, in the vertical direction, the metal member 37 functioning as the connector of the optional unit 30 connecting the optional unit 30 to the intermediate unit 20 onto the imaginary plane. Further, a projective region obtained by projecting, in the vertical direction, the receiver portion 27a functioning as the connector of the intermediate unit 20 connecting the intermediate unit 20 to the optional unit 30 onto the imaginary plane coincides with a projective region obtained by projecting, in the vertical direction, the metal member 17 functioning as the connector of the main body 10 connecting the main body 10 to the intermediate unit 20 onto the imaginary plane.

With the configurations of the metal members 17, 27, 37 described above, the optional unit 30 is mountable on and removable from the upper surface 21a of the intermediate unit 20. In an instance where the intermediate unit 20 is not provided in the printer 1, the optional unit 30 is mountable on and removable from the upper surface 11a of the housing 11 (the main body 10).

In an inner space sandwiched by the pair of columns 21L, 21R and the pair of columns 31L, 31R in the right-left direction, there are disposed: the conveyance rollers 22, 32; a motor 38 shown in FIGS. 2 and 3B for driving the conveyance rollers 22, 32; connectors 18, 28; cables 18c, 28c; gears (transmission mechanism) for transmitting a drive force of the motor 38 to the conveyance rollers 22, 32; a solenoid 39s (drive member) shown in FIGS. 4A and 4B for moving the switcher 13c; and a transmission member 29d. While only the conveyance rollers 22 are illustrated in FIG. 2, the conveyance rollers 32 are disposed so as to align with the conveyance rollers 22 as seen in the vertical direction. While only one gear 23 is illustrated in FIG. 2, a plurality of gears are disposed. The transmission member 29d is connected to both of the switcher 13c and the solenoid 39s and is movable in the vertical direction so as to transmit a drive force of the solenoid 39s to the switcher 13c.

As shown in FIG. 2, a projective point G38 obtained by projecting a center of gravity of the motor 38 in the vertical direction onto the imaginary plane orthogonal to the vertical direction, a projective point G20 obtained by projecting a center of gravity of the intermediate unit 20 in the vertical direction onto the imaginary plane, and a projective point G obtained by projecting a center of gravity of a portion constituted by the intermediate unit 20 and the optional unit 30 in the vertical direction onto the imaginary plane are located within a projective region 11A obtained by projecting the housing 11 in the vertical direction onto the imaginary plane.

As shown in FIG. 3B, the motor 38 is attached to a lower end of an inner surface of the column 31R. The connector 28 is attached to an upper end of an inner surface of the column 21R. When the optional unit 30 is mounted on the intermediate unit 20, the connector 28 is connected to terminals of the motor 38. The cable 28c extends downward from the connector 28 along the inner surface of the column 21R. The connector 18 is attached to an upper end of an inner surface of the column 11R. When the intermediate unit 20 is mounted on the main body 10, the connector 18 is connected to a lower end of the cable 28c. When the optional unit 30 is mounted on the main body 10, the connector 18 is connected to the terminals of the motor 38. The cable 18c extends downward from the connector 18 along the inner surface of the column 11R so as to be connected to the controller 16.

As shown in FIGS. 4A and 4B, the solenoid 39s is attached to a lower end of an inner surface of the column 31L. At the lower end of the inner surface of the column 31L, there are provided: a pivot member 39a pivotable about a shaft 39ax that extends in the right-left direction; a spring 39b contacting a distal end of an arm 39a1 which is one of two arms of the pivot member 39a; a transmission member 39d engaging with an arm 39a2 which is the other of the two arms of the pivot member 39a; and a stopper 39c. The arm 39a1 is held in engagement with a plunger of the solenoid 39s. The transmission member 39d extends in the vertical direction and comes into contact with an upper end of the transmission member 29d when the optional unit 30 is mounted on the intermediate unit 20. The spring 39b biases the pivot member 39a in a direction in which the transmission member 39d moves upward. The stopper 39c limits an upward movement of the transmission member 39d when it comes into contact with the arm 39a2.

The transmission member 29d is attached to the inner surface of the column 21L and extends in the vertical direction along the inner surface. The transmission member 29d has the same length in the vertical direction as the column 21L. On the inner surface of the column 21L, there are provided: a pivot member 29a pivotable about a shaft 29ax that extends in the right-left direction; a spring 29b contacting a distal end of an arm 29a1 which is one of two arms of the pivot member 29a; and a stopper 29c. An arm 29a2, which is the other of the two arms of the pivot member 29a, is held in engagement with the transmission member 29d. The spring 29b biases the pivot member 29a in a direction in which the transmission member 29*d* moves upward. The stopper 29*c* limits an upward movement of the transmission member 29*d* when it comes into contact with a protrusion 29*d*1 formed on the surface of the transmission member 29*d*.

The switcher 13*c* is attached to an upper end of the inner surface of the column 11L. At the upper end of the inner surface of the column 11L, there are provided: a pivot member 19*a* pivotable about the shaft 13*ca*; a spring 19*b* contacting a distal end of an arm 19*a*1 which is one of two arms of the pivot member 19*a*; a transmission member 19*d* contacting an upper end of an arm 19*a*2 which is the other of the two arms of the pivot member 19*a*; and a stopper 19*c*. The pivot member 19*a* is fixed to a proximal end of the shaft 13*ca* and is configured to pivot so as to rotate the shaft 13*ca* for thereby pivoting the switcher 13*c*. The transmission member 19*d* extends in the vertical direction. When the intermediate unit 20 is mounted on the main body 10, the transmission member 19*d* comes into contact with a lower end of the transmission member 29*d*. When the optional unit 30 is mounted on the main body 10, the transmission member 19*d* comes into contact with a lower end of the transmission member 39*d*. The spring 19*b* biases the pivot member 19*a* in a direction in which the transmission member 19*d* moves upward. The stopper 19*c* limits an upward movement of the transmission member 19*d* when it comes into contact with a protrusion 19*d*1 formed on the surface of the transmission member 19*d*.

When the solenoid 39*s* is not driven, namely, when the transmission member 29*d* does not transmit the drive force of the solenoid 39*s* to the switcher 13*c*, the components described above are in a state shown in FIG. 4A. In this state, the lower end of the transmission member 39*d* is located at the same height level as the lower end of the column 31L. Thus, the transmission member 39*d* does not protrude downward from the lower surface 31*a* of the housing 31. The upper end of the transmission member 29*d* is located at the same height level as the upper end of the column 21L while the lower end of the transmission member 29*d* is located at the same height level as the lower end of the column 21L. Thus, the transmission member 29*d* does not protrude downward from the lower surface 21*b* of the housing 21. The upper end of the transmission ember 19*d* is located at the same height level as the upper end of the column 11L. Thus, the transmission member 19*d* is not retracted downward from the upper surface 11*a* of the housing 11.

When the solenoid 39*s* is driven, namely, when the transmission member 29*d* transmits the drive force of the solenoid 39*s* to the switcher 13*c*, the state of the components described above is changed to a state shown in FIG. 4B. Specifically, the plunger of the solenoid 39*s* contracts, so that the pivot member 39*a* pivots against the biasing force of the spring 39*b* and the transmission member 39*d* moves downward. As a result, the transmission member 29*d* moves downward by being pushed down by the transmission member 39*d*, and the transmission member 19*d* moves downward by being pushed down by the transmission member 29*d*. In this instance, the downward movement of the transmission member 29*d* causes the pivot member 29*a* to pivot against the biasing force of the spring 29*b*, and the downward movement of the transmission member 19*d* causes the pivot member 19*a* to pivot against the biasing force of the spring 19*b*. As a result, the switcher 13*c* moves from the position (FIG. 4A) at which the switcher 13*c* permits the sheet to be conveyed to the receiving tray 15 to the position (FIG. 4B) at which the switcher 13*c* permits the sheet to be conveyed to the discharge opening 11*x*. In this instance, the lower end of the transmission member 39*d* is located at a height level lower than the lower end of the column 31L. Thus, the transmission member 39*d* protrudes downward from the lower surface 31*a* of the housing 31. The lower end of the transmission member 29*d* is located at a height level lower than the lower end of the column 21L. Thus, the transmission member 39*d* protrudes downward from the lower surface 21*b* of the housing 21. The upper end of the transmission member 19*d* is located at a height level lower than the upper end of the column 11L. Thus, the transmission member 19*d* is retracted downward from the upper surface 11*a* of the housing 11.

The present embodiment employs the configuration shown in FIG. 1 in which the scanner unit 40 is disposed on the upper surface of the intermediate unit 20, the discharge opening 21*y* is formed outside the region of the upper surface of the intermediate unit 20 in which the scanner unit 40 is disposed, and the optional unit 30 is mounted on the upper portion of the intermediate unit 20, instead of employing the configuration in which the upright portion is mounted on one side of the main body 10 and the intermediate unit 20 (the conveying apparatus), and the optional unit 30 is mounted on the upper portion thereof. The configuration according to the present embodiment prevents the footprint of the printer 1 as a whole on the horizontal plane from increasing and also prevents the printer 1 from toppling over. Thus, the present embodiment prevents, in the configuration in which the optional unit 30 is removably mountable, the footprint of the printer 1 as a whole on the horizontal plane from increasing and also prevents the printer 1 from toppling over.

The receiving tray 15 is disposed below the scanner unit 40. Further, the scanner unit 40 is disposed downstream of the discharge opening 21*y* in the movement direction D15. For easy removal of the sheet, it is natural to match the movement direction D15 in which the sheet moves when received by the receiving tray 15 and the movement direction D35 in which the sheet moves when received by each receiving tray 35 with each other. In an instance where the movement directions D15, D35 are matched with each other, the configuration described above permits the receiving trays 35, the scanner unit 40, and the receiving tray 15 to be arranged in the vertical direction when the optional unit 30 is mounted on the intermediate unit 20, thereby ensuring a stabilized weight balance of the printer 1 as a whole and more effectively preventing the printer 1 from toppling over.

The scanner unit 40 includes the cover 41 configured to be openable about the shaft 41*a* located on the upstream side in the movement direction D15, so as to extend in the right-left direction (which is orthogonal to the movement direction D15 and the vertical direction). It is thus possible to allow a user to take the sheet out of the receiving tray 15 (and the receiving trays 35) and to open and close the cover 41 on the same side (the front side) of the printer 1, improving the workability for the user.

The printer 1 includes the main body 10, the scanner unit 40, and the intermediate unit 20 which is mountable on and removable from the upper surface of the main body 10. Further, the optional unit 30 is mountable on and removable from the upper surface of the intermediate unit 20. In this arrangement, the structure of the optional unit 30 is made common for various types of the main body 10, and the structure of the intermediate unit 20, i.e., the structure of the connector of the intermediate unit 20 connecting the intermediate unit 20 to the main body 10, is changed depending upon the types of the main body 10, thereby eliminating a need of developing the optional units 30 to be used exclusively for respective types of the main body 10 and resulting in a reduction of the cost of developing the optional unit 30.

The optional unit 30 includes the motor 38 (FIG. 3B) for driving the conveyance rollers 22 provided in the intermediate unit 20. In this arrangement, the motor is provided in the optional unit 30 which is not required to be developed for various types of the main body 10 while the motor is not provided in the intermediate unit 20 which is required to be developed for the respective types of the main body 10, thereby reducing a production cost of the intermediate unit 20 and reducing the cost of developing the printer 1 as a whole.

Second Embodiment

Figure 5:
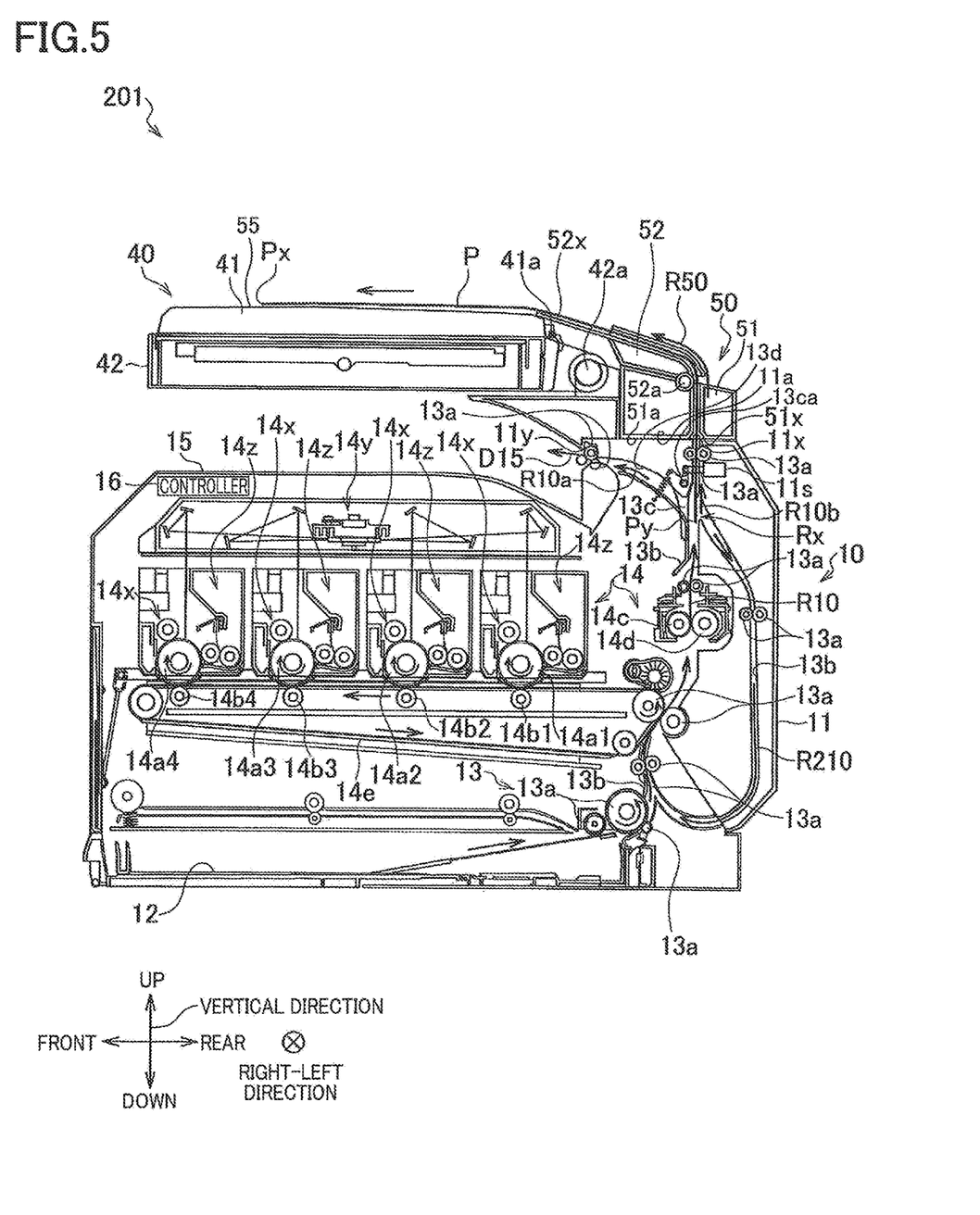
FIG. 5 is a schematic view of a printer according to a second embodiment.
Figure 6:
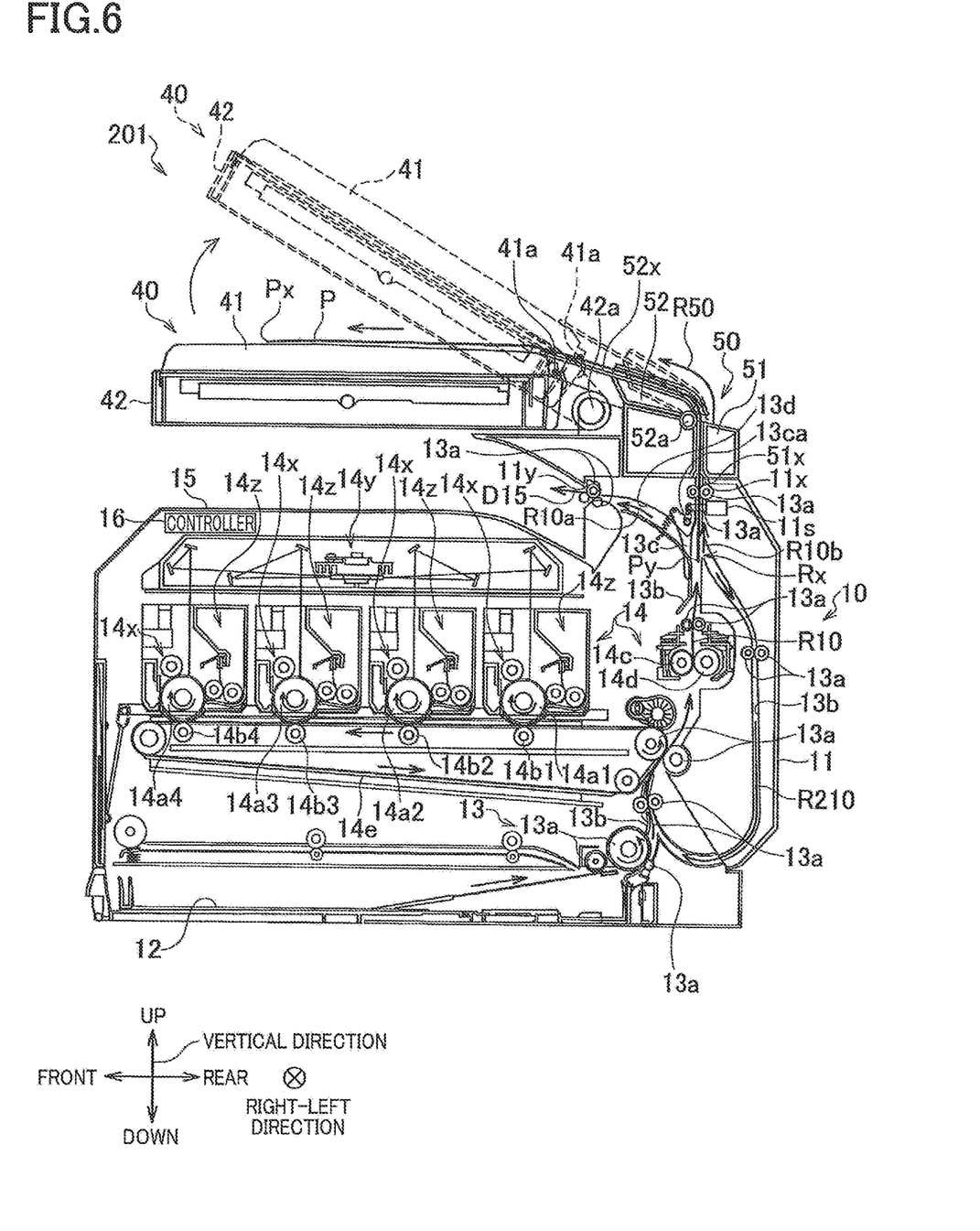
FIG. 6 is a schematic view showing a state in which a housing of a scanner unit is opened and closed in the printer of the second embodiment.

Referring next to FIGS. 5 and 6, there will be described a second embodiment.

A printer 201 of the second embodiment and the printer 1 of the first embodiment are different in the following configuration and are identical in the other configuration. That is, the printer 201 differs from the printer 1 in that: the printer 201 includes a cover 50 in place of the intermediate unit 20 and the optional unit 30; the scanner unit 40 is disposed not on the upper surface of the intermediate unit 20 but on the upper surface of the main body 10; the scanner unit 40 which is configured such that the cover 41 is openable about the shaft 41a is also configured such that a housing 42 of the scanner unit 40 is openable about a shaft 42a located on the upstream side in the movement direction D15 so as to extend in the right-left direction (which is orthogonal to the movement direction D15 and the vertical direction); a solenoid 11s for moving the switcher 13c is provided in the main body 10; the image former 14 includes four photoconductive drums 14a1-14a4 corresponding to respective four colors (CMYK) and the printer 201 is a color printer; and duplex printing on the sheet is performable.

In the second embodiment, a path R210 is formed in the housing 11, in addition to the path R10. The path R210 is for conveying, again to the image former 14, the sheet having the image formed on its first surface.

The image former 14 includes: the four photoconductive drums 14a1-14a4; four transfer rollers 14b1-14b4; four charging units 14x; the laser unit 14y; four toner units 14z; the fixing roller 14c; the pressure roller 14d; and an intermediate transfer belt 14e. The intermediate transfer belt 14e is in contact with a portion of the path R10 on the upstream side of the branch position Rx in the path R10. Each of the photoconductive drums 14a1-14a4 forms a pair with a corresponding one of the transfer rollers 14b1-14b4. Each photoconductive drum 14a1-14a4 and each transfer roller 14b1-14b4 that form a pair are opposed to each other with the intermediate transfer belt 14e interposed therebetween. The four pairs are arranged in a running direction of the intermediate transfer belt 14e. The fixing roller 14c and the pressure roller 14d are in contact with each other with the path R10 interposed therebetween on the upstream side of the branch position Rx in the path R10 and on the downstream side of the intermediate transfer belt 14e.

The surfaces of the photoconductive drums 14a1-14a4 are charged by the respective charging units 14x and are irradiated with a laser light emitted from the laser unit 14y, so that electrostatic latent images are formed on the respective surfaces. Subsequently, toner is supplied to the surfaces from the respective toner units 14z so as to form toner images thereon. The transfer rollers 14b1-14b4, to which is applied a voltage opposite to a voltage applied to the photoconductive drums 14a1-14a4, transfer the toner images onto an outer surface of the intermediate transfer belt 14e. Thereafter, the toner images are transferred from the outer surface of the intermediate transfer belt 14e to the sheet, and toner is fixed on the sheet by the heat of the fixing roller 14c and the pressure of the fixing roller 14c and the pressure roller 14d. Thus, a color image is formed on the sheet by the image former 14.

The cover 50 is mountable on and removable from the upper surface 11a of the housing 11 in a state in which the intermediate unit 20 and the optional unit 30 are not mounted on the upper surface 11a of the housing 11. There is formed, in a lower surface 51a of the cover 50, an introduction opening 51x (as one example of "third introduction opening") corresponding to the discharge opening 11x (the first discharge opening). There is formed, in the cover 50, a path R50 (as one example of "fifth conveyance path") through which a sheet P is conveyed from the introduction opening 51x.

The switcher 13c is movable so as to be selectively located at: a position at which the switcher 13c permits the sheet to be conveyed to the receiving tray 15; a position at which the switcher 13c permits the sheet to be conveyed to the discharge opening 11x; and a position at which the switcher 13c permits the sheet, which has been conveyed to the path R50 and the conveyance direction has been reversed, to be guided to the path R210.

The cover 50 includes a lower portion 51 at which the introduction opening 51x is formed and an upper portion 52 pivotable about a shaft 52a that extends in the right-left direction. The upper portion 52 includes a distal end 52x contacting the upper surface of the cover 41. When the cover 41 opens and closes about the shaft 41a and when the housing 42 opens and closes about the shaft 42a, the distal end 52x kept in contact with the upper surface of the cover 41 pivots about the shaft 52a.

When the controller 16 receives a command of single-sided printing, the controller 16 controls the conveyor mechanism 13 and the image former 14 to convey the sheet P and form an image as described below.

The sheet P having an image formed on the first surface by the image former 14 is conveyed along the path R10a and received by the receiving tray 15. Alternatively, the sheet P having an image formed on the first surface by the image former 14 is conveyed along the path R10b, subsequently conveyed to the path R50 via the discharge opening 11x and the introduction opening 51x, and finally discharged onto the cover 41.

When the controller 16 receives a command of duplex printing, the controller 16 controls the conveyor mechanism 13 and the image former 14 to convey the sheet P and form an image as described below.

The sheet P having an image formed on the first surface by the image former 14 is conveyed along the path R10b and is subsequently conveyed to the path R50 via the discharge opening 11x and the introduction opening 51x. The conveyance direction of the sheet P is reversed at timing when a leading end Px of the sheet P is located outside the cover 50 and a trailing end Py thereof is located in the path R10b on the downstream side of the branch position Rx. Thereafter, the switcher 13c is placed at the position at which the switcher 13c permits the sheet P to be conveyed to the path R210, so that the sheet P is conveyed again to the image former 14 along the path R210. After the image former 14 forms an image on a second surface of the sheet P opposite to the first surface, the sheet P is received by the receiving tray 15 or by the receiving tray 55 (as one example of "third tray") of the cover 41.

The second embodiment described above offers the same advantages as those offered by the first embodiment according to the same configuration as employed in the first embodiment. The second embodiment further offers the following advantages.

Image formation on both surfaces of the sheet P and discharging of the sheet P onto the scanner unit 40 can be performed using the path R50 provided in the cover 50.

The controller 16 controls the conveyor mechanism 13 and the image former 14 such that the sheet P, which has an image formed on the first surface by the image former 14, is conveyed to the path R50 via the discharge opening 11x and the introduction opening 51x and is subsequently conveyed again to the image former 14 after the conveyance direction of the sheet P has been reversed, so as to permit the image former 14 to form an image on the second surface of the sheet P. In this instance, image formation on both surfaces of the sheet P can be achieved using the path R50 provided in the cover 50.

Not only the cover 41 but also the housing 42 is openable. In this arrangement, the user can take the sheet out of the receiving tray 15 (and the receiving trays 55) and can open and close the cover 41 or the housing 42, on the same side (the front side) of the printer 201, enhancing the workability for the user.

Third Embodiment

Figure 7:
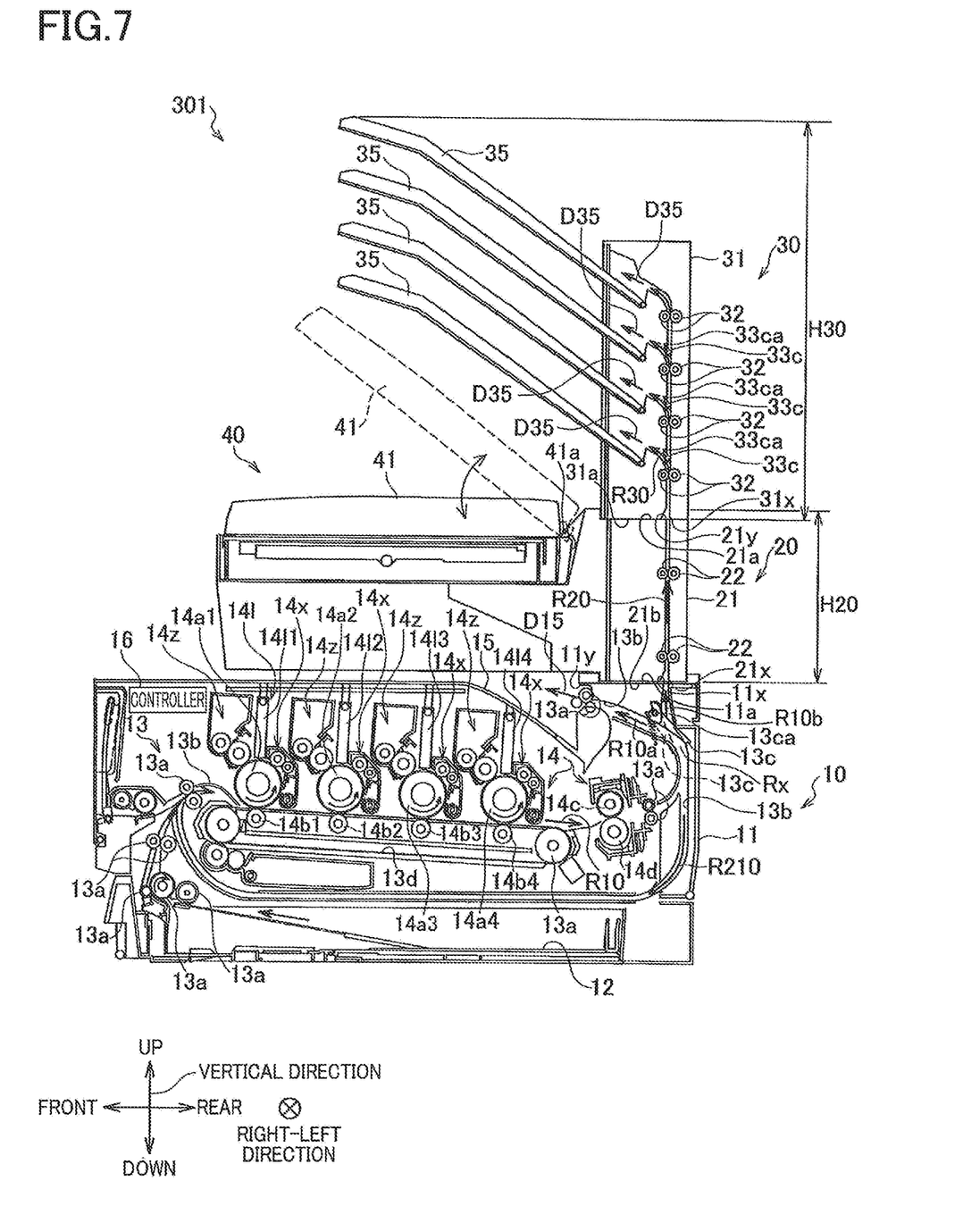
FIG. 7 is a schematic view of a printer according to a third embodiment.

Referring next to FIG. 7, there will be described a third embodiment.

A printer 301 of the third embodiment and the printer 1 of the first embodiment are different in the following configuration and are identical in the other configuration. That is, the printer 301 differs from the printer 1 in the structure of the image former 14, namely, the printer 301 is an LED printer including light sources 14*l*1-14*l*4 of light emitting diodes (LED). Further, the printer 301 differs from the printer 1 in the structure of the conveyor mechanism 13.

The conveyor mechanism 13 includes a loop-like conveyor belt 13d in addition to the conveyance rollers 13a, the guide 13b, and the switcher 13c. The conveyor belt 13d conveys the sheet while supporting the sheet below the four photoconductive drums 14a1-14a4.

The image former 14 includes the four photoconductive drums 14a1-14a4, the four transfer rollers 14b1-14b4, the four charging units 14x, an LED unit 14*l*, the four toner units 14z, the fixing roller 14c, and the pressure roller 14d. The LED unit 14*l* includes four light sources 14*l*1-14*l*4. Each of the photoconductive drums 14a1-14a4 forms a pair with a corresponding one of the transfer rollers 14b1-14b4. Each photoconductive drum 14a1-14a4 and each transfer roller 14b1-14b4 that form a pair are opposed to each other with the conveyor belt 13d interposed therebetween. The four pairs are arranged in the running direction of the conveyor belt 13d. The fixing roller 14c and the pressure roller 14d are in contact with each other with the path R10 interposed therebetween on the upstream side of the branch position Rx in the path R10 and on the downstream side of the conveyor belt 13d.

The surfaces of the photoconductive drums 14a1-14a4 are charged by the respective charging units 14x and are irradiated with LED lights emitted respectively from the light sources 14*l*1-14*l*4 of the LED unit 14*l*, so as to form electrostatic latent images. Subsequently, toner is supplied to the surfaces from the respective toner units 14z, so as to form toner images. The transfer rollers 14b1-14b4, to which is applied a voltage opposite to a voltage applied to the photoconductive drums 14a1-14a4, transfer the toner images onto the sheet conveyed by the conveyor belt 13d while being supported, and toner is fixed on the sheet by the heat of the fixing roller 14c and the pressure of the fixing roller 14c and the pressure roller 14d. Thus, a color image is formed on the sheet by the image former 14.

The third embodiment described above offers the same advantages as those offered by the first embodiment according to the same configuration as employed in the first embodiment.

Fourth Embodiment

Figure 8:
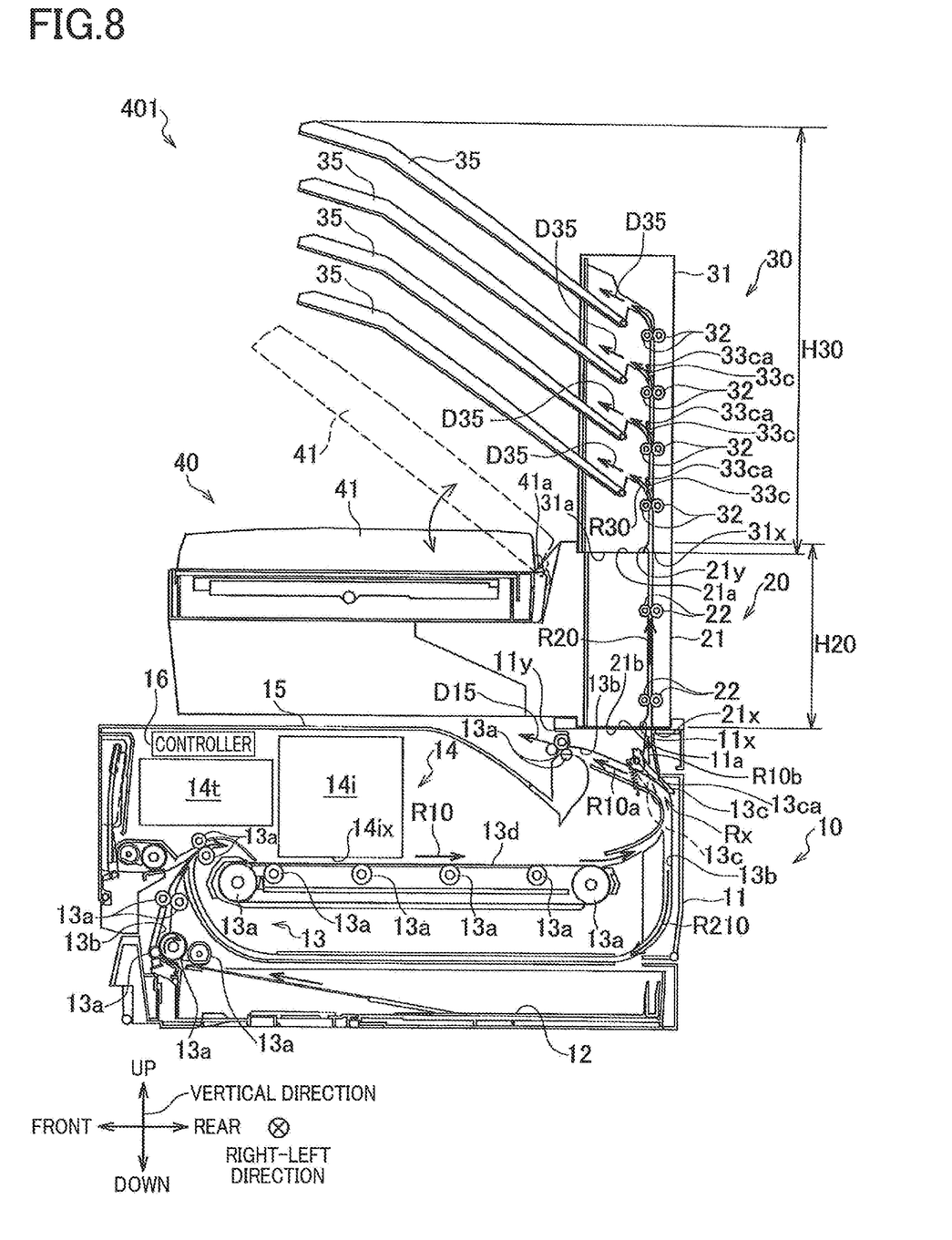
FIG. 8 is a schematic view of a printer according to a fourth embodiment.

Referring next to FIG. 8, there will be described a fourth embodiment.

A printer 401 of the fourth embodiment and the printer 1 of the first embodiment are different in the following configuration and are identical in the other configuration. That is, the printer 401 differs from the printer 1 in the structure of the image former 14, namely, the printer 401 is a line ink-jet printer having a line ink-jet head 14i. Further, the printer 401 differs from the printer 1 in the structure of the conveyor mechanism 13.

The conveyor mechanism 13 includes the loop-like conveyor belt 13d, in addition to the conveyance rollers 13a, the guide 13b, and the switcher 13c.

The image former 14 includes the ink-jet head 14i and an ink tank 14t. The ink-jet head 14i is held in communication with the ink tank 14t. There are formed, in the ink-jet head 14i, a reservoir for storing ink supplied from the ink tank 14t and ink passages which branch off from the reservoir toward a plurality of ejection openings. The ejection openings are open to a lower surface 14ix of the ink-jet head 14i. A predetermined spacing is formed between the lower surface 14ix of the ink-jet head 14i and the upper surface of the conveyor belt 13d.

Ink is ejected selectively from the ejection openings of the ink-jet head 14i to the sheet conveyed by the conveyor belt 13d while being supported, so that ink is attached onto the sheet. Thus, the image former 14 forms an image on the sheet.

The fourth embodiment described above offers the same advantages as those offered by the first embodiment according to the same configuration as employed in the first embodiment.

Fifth Embodiment

Figure 9A:
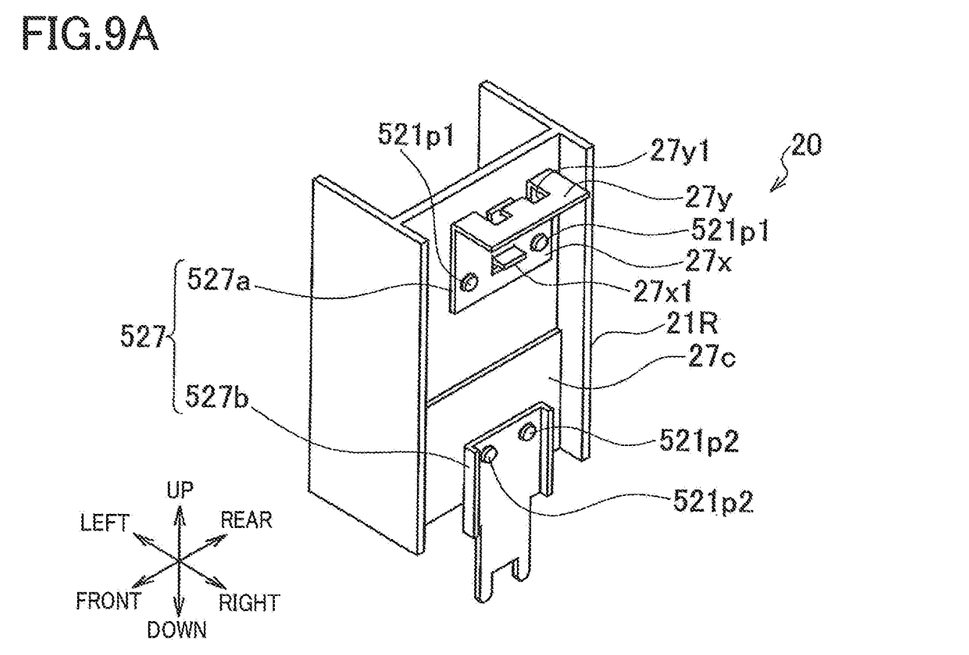
FIG. 9A is a perspective view showing an outer side of a right-side column of an intermediate unit of a printer according to a fifth embodiment and FIG. 9B is a perspective view of a right-side column of an intermediate unit of a printer according to a sixth embodiment.

Referring next to FIG. 9A, there will be described a fifth embodiment.

A printer of the fifth embodiment and the printer 1 of the first embodiment are different in the structure of the metal member of the intermediate unit 20 and are identical in the other configuration.

In the fifth embodiment, a metal member 527 of the intermediate unit 20 includes a receiver portion 527a and an insertion portion 527b which are not fixed relative to each other but are separated away from each other. The receiver portion 527a and the insertion portion 527b are fixed to the column 21L, 21R independently of each other. The receiver portion 527a is fixed to the column 21L, 21R such that the lower end of the base portion 27x is inserted onto a pair of protrusions 521p1 provided on the outer surface of the column 21L, 21R. The insertion portion 527b is fixed to the column 21L, 21R such that its upper end is inserted onto a pair of protrusions 521p2 provided on the outer surface of the plate 27c.

The base portion 27x of the receiver portion 527a is in contact with the outer surface of the column 21L, 21R. The insertion portion 527b is in contact with the outer surface of the plate 27c. Also in the present embodiment, a projective region obtained by projecting the insertion portion 527b in the vertical direction onto the imaginary plane orthogonal to the vertical direction and a projective region obtained by projecting the base portion 27x of the receiver portion 527a in the vertical direction onto the imaginary plane do not coincide with each other but are adjacent to each other.

The fifth embodiment described above offers the same advantages as those offered by the first embodiment according to the same configuration as employed in the first embodiment. Further, the metal member of the intermediate unit 20 has a smaller size as compared with that in the first embodiment, resulting in a reduced cost for the metal member of the intermediate unit 20.

Sixth Embodiment

Figure 9B:
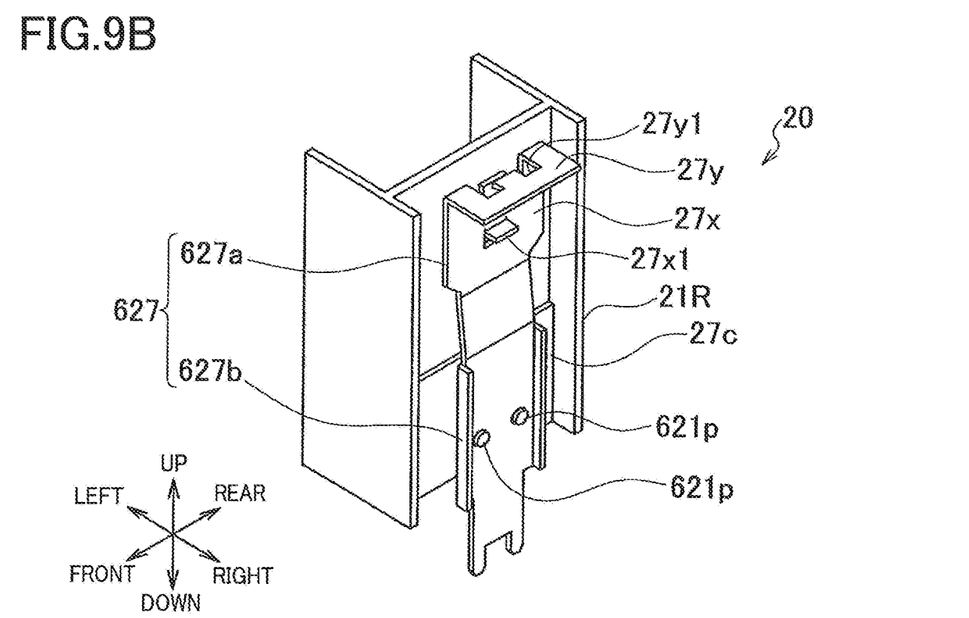

Referring next to FIG. 9B, there will be described a sixth embodiment.

A printer of the sixth embodiment and the printer 1 of the first embodiment are different in the structure of the metal member of the intermediate unit 20 and are identical in the other configuration.

In the sixth embodiment, a metal member 627 of the intermediate unit 20 includes a receiver portion 627a and an insertion portion 627b formed integrally with each other. The metal member 627 is fixed to the column 21L, 21R such that the insertion portion 627b is inserted onto a pair of protrusions 621p provided on the outer surface of the plate 27c.

The base portion 27x of the receiver portion 627a is in contact with the outer surface of the column 21L, 21R. The insertion portion 627b is in contact with the outer surface of the plate 27c. Also in the present embodiment, a projective region obtained by projecting the insertion portion 627b in the vertical direction onto the imaginary plane orthogonal to the vertical direction and a projective region obtained by projecting the base portion 27x of the receiver portion 627a in the vertical direction onto the imaginary plane do not coincide with each other but are adjacent to each other.

The sixth embodiment described above offers the same advantages as those offered by the first embodiment according to the same configuration as employed in the first embodiment. Further, the metal member of the intermediate unit 20 has a reduced number of components as compared with the first embodiment, facilitating attaching of the metal member of the intermediate unit 20 to the column.

While the embodiments have been described above, it is to be understood that the disclosure is not limited to the details of the illustrated embodiments, but may be modified with various changes and modifications, which may occur to those skilled in the art, without departing from in the spirit and scope of the disclosure.

The number of first trays and the number of second trays are optional. For instance, the main body may include a plurality of first trays while the tray unit may include one second tray. The number of conveyance rollers provided in the intermediate unit is not limited to four, but may be any optional number equal to or larger than one. Alternatively, no conveyance rollers may be provided in the intermediate unit. The motor for driving the conveyance rollers of the intermediate unit may be provided in the intermediate unit instead of in the tray unit. The first discharge opening of the intermediate unit may be located upstream or downstream of the second introduction opening of the intermediate unit in the first direction (the movement direction) in which the medium moves when received by the second tray.

It is not necessarily required for the image reader to include the opening and closing member. The structure of the drive member for moving the switcher and the structure of the transmission member for transmitting the drive force of the drive member to the switcher may be changed. For instance, the drive member and the transmission member may be provided for the intermediate unit or the main body instead of for the tray unit. The motor and the transmission mechanism may be disposed in outer spaces located outside the pairs of columns. The connectors may be disposed in the inner space sandwiched by the pairs of columns. It is not necessarily required for each of the intermediate unit and the tray unit to include the pair of columns. The structure of each connector may be changed. The tray unit may be configured not to be removably mountable on the upper surface of the main body.

The projective point obtained by projecting the center of gravity of the motor in the vertical direction onto the imaginary plane orthogonal to the vertical direction, the projective point obtained by projecting the center of gravity of the intermediate unit in the vertical direction onto the imaginary plane, and the projective point obtained by projecting the center of gravity of the portion constituted by the intermediate unit and the tray unit in the vertical direction onto the imaginary plane are not necessarily required to be located within the projective region obtained by projecting the main body in the vertical direction onto the imaginary plane.

The present disclosure is applicable not only to the printer but also to a facsimile, a copying machine, a multi-function peripheral (MFP), and the like. Also, the present disclosure is applicable not only to the laser image forming apparatus but also to an ink-jet image forming apparatus and a thermal image forming apparatus. The present disclosure is applicable not only to the image forming apparatus but also to devices not equipped with the image former that includes the photoconductive drum, the ink-jet head, and the like, namely, devices configured not to perform image formation on the medium. The medium is not limited to the sheet but may be a cloth or the like.

What is claimed is:

1. A conveying apparatus, comprising:
    a conveyor mechanism configured to convey a medium through a first conveyance path;
    a housing that houses the conveyor mechanism;
    a first tray configured to receive the medium conveyed by the conveyor mechanism;
    an image reader disposed above the first tray,
    wherein a first discharge opening is formed in an upper surface of the housing so as not to overlap the image reader when viewed from above, the medium conveyed by the conveyor mechanism being discharged outside the housing from the first discharge opening,
    wherein the conveying apparatus further comprises:
        a switcher configured to switch a destination of the medium selectively between the first tray and the first discharge opening; and
        a tray unit including (a) a path-defining housing which is disposed so as not to overlap the image reader when viewed from above and which includes a first introduction opening formed in a lower surface of the path-defining housing so as to be opposed to the first discharge opening and (b) at least one second tray, the path-defining housing defining a second conveyance path through which the medium that has passed through the first discharge opening and the first introduction opening is conveyed, the at least one second tray being configured to receive the medium that has been conveyed through the second conveyance path.

2. The conveying apparatus according to claim 1, wherein the first introduction opening is formed in a lower surface of the tray unit.

3. The conveying apparatus according to claim 1, wherein the at least one second tray is disposed so as to overlap the image reader when viewed from above.

4. The conveying apparatus according to claim 1, wherein the housing includes:
a first housing in which is formed a third conveyance path as a part of the first conveyance path; and
a second housing in which is formed a fourth conveyance path as a part of the first conveyance path and which is disposed above the first housing, the first discharge opening being formed in an upper surface of the second housing as the upper surface of the housing.

5. The conveying apparatus according to claim 4, wherein a second discharge opening is formed in an upper surface of the first housing, the medium that has been conveyed through the third conveyance path being discharged from the second discharge opening, and
wherein a second introduction opening is formed in a lower surface of the second housing so as to be opposed to the second discharge opening.

6. The conveying apparatus according to claim 4, wherein the second housing includes at least one conveyance roller configured to convey the medium through the fourth conveyance path, and
wherein the tray unit includes a motor for driving the at least one conveyance roller.

7. The conveying apparatus according to claim 1, wherein the image reader is disposed downstream of the first discharge opening in a first direction in which the medium moves when received by the first tray.

8. The conveying apparatus according to claim 7, wherein the image reader includes an opening and closing member configured to be openable about a shaft which is located on an upstream side in the first direction so as to extend in a direction orthogonal to the first direction and a vertical direction.

9. A conveying apparatus, comprising:
a conveyor mechanism configured to convey a medium through a first conveyance path;
a housing that houses the conveyor mechanism;
a first tray configured to receive the medium conveyed by the conveyor mechanism;
an image reader disposed above the first tray,
wherein a first discharge opening is formed in an upper surface of the housing so as not to overlap the image reader when viewed from above, the medium conveyed by the conveyor mechanism being discharged outside the housing from the first discharge opening,
wherein the conveying apparatus further comprises:
a switcher configured to switch a destination of the medium selectively between the first tray and the first discharge opening; and
a tray unit including a first introduction opening opposed to the first discharge opening, a second conveyance path through which the medium that has passed through the first discharge opening and the first introduction opening is conveyed, and at least one second tray configured to receive the medium that has been conveyed through the second conveyance path,
wherein the housing includes: a first housing in which is formed a third conveyance path as a part of the first conveyance path; and a second housing in which is formed a fourth conveyance path as a part of the first conveyance path and which is disposed above the first housing, the first discharge opening being formed in an upper surface of the second housing as the upper surface of the housing.

10. The conveying apparatus according to claim 9, wherein a second discharge opening is formed in an upper surface of the first housing, the medium that has been conveyed through the third conveyance path being discharged from the second discharge opening, and
wherein a second introduction opening is formed in a lower surface of the second housing so as to be opposed to the second discharge opening.

11. The conveying apparatus according to claim 9, wherein the second housing includes at least one conveyance roller configured to convey the medium through the fourth conveyance path, and
wherein the tray unit includes a motor for driving the at least one conveyance roller.

* * * * *